(12) United States Patent
Trethewey (10) Patent No.: US 7,746,877 B2
(45) Date of Patent: Jun. 29, 2010

(54) METHOD AND APPARATUS FOR COMMUNICATING LOSS OF ALTERNATING CURRENT POWER SUPPLY

(75) Inventor: Paul M. Trethewey, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 722 days.

(21) Appl. No.: 11/740,779

(22) Filed: Apr. 26, 2007

(65) Prior Publication Data

US 2008/0267194 A1 Oct. 30, 2008

(51) Int. Cl.
*H04L 12/28* (2006.01)
(52) U.S. Cl. .................. 370/401; 370/352; 713/340
(58) Field of Classification Search .................. None
See application file for complete search history.

(56) References Cited

U.S. PATENT DOCUMENTS

| | | | |
|---|---|---|---|
| 5,946,617 A * | 8/1999 | Portaro et al. | ............ 455/422.1 |
| 2003/0006650 A1 | 1/2003 | Tang et al. | |
| 2003/0201779 A1 | 10/2003 | Sister et al. | |
| 2005/0040864 A1 | 2/2005 | Ficken et al. | |
| 2006/0091877 A1 | 5/2006 | Robinson et al. | |
| 2006/0146461 A1 | 7/2006 | Jones et al. | |
| 2006/0212235 A1 | 9/2006 | Kolker et al. | |
| 2006/0274764 A1 * | 12/2006 | Mah et al. | ................ 370/401 |
| 2007/0058608 A1 * | 3/2007 | Lin | .......................... 370/352 |

OTHER PUBLICATIONS

International Search Report and Written Opinion of the International Searching Authority, PCT/US08/02369 filed Feb. 21, 2008, mailed Jun. 11, 2008, 11 pages..
International Preliminary Report on Patentability, PCT/US2008/002369 filed Feb. 21, 2008, mailed Nov. 5, 2009, 7 pages.

* cited by examiner

*Primary Examiner*—Duc C Ho
(74) *Attorney, Agent, or Firm*—Blakely, Sokoloff, Taylor & Zafman LLP (57) ABSTRACT

In general, various methods, apparatuses, and systems are described for communicating a loss of an AC power source. In at least certain embodiments, a broadband communication gateway receives a direct current (DC) output signal from an alternating current (AC) to DC converter that detects a loss of an AC input signal. The apparatus further includes a processing unit that generates a communication message in response to receiving an interrupt signal based on the detection of the loss of the AC input signal. The processing unit controls an analog front end that sends the communication message to a device external to the broadband communication gateway in response to the interrupt signal prior to a voltage of the DC output signal decreasing below a threshold voltage needed for operation of the broadband communication gateway.

16 Claims, 6 Drawing Sheets

METHOD AND APPARATUS FOR COMMUNICATING LOSS OF ALTERNATING CURRENT POWER SUPPLY

FIELD OF THE DISCLOSURE

Embodiments of the present disclosure generally relate to communicating loss of an alternating current (AC) power supply.

BACKGROUND OF THE DISCLOSURE

Typically, communication systems that provide broadband access to residential or business customers contain a communication gateway which consists of an xDSL (any type of digital subscriber line generally communicated over copper lines) modem or xPON (any type of passive optical network generally communicated over optic fibers) interface combined with various local area networking (LAN) technologies to enable sharing the broadband access with other computers or devices within the building. Wireless local area network standards and home phone line networking (HPNA) are examples of such LAN technologies. In addition, some communication systems may provide a voice-over-internet-protocol (VOIP) feature to allow telephone calls via the broadband link. Some systems may, in addition to broadband access sharing, need to distribute broadband media content such as video streams into various locations within the building. A communication gateway routes various types of communications, such as data, voice, and video, within the building. The communications may be sent to various devices such as computers, televisions, and phones. A communication gateway may be a broadband, digital subscriber line (DSL), or other similar type of gateway.

Typically, a communication gateway is powered based on an AC power supply within the building. An AC to direct current (DC) converter can convert the AC power signal into a DC power signal for use by the communication gateway. At certain times, the AC power supply is interrupted causing the communication gateway to power down and become non-operational. Telephone companies that provide telecommunication services such as DSL to their customers desire that when a customer's AC power supply is interrupted, the customer's communication gateway sends a communication such as a dying gasp signal to the central office of the telephone company. The dying gasp signal tells the terminal equipment at the central office that the customer is stopping the communication session because of an AC power supply failure. Using this information, the central office can free up and reassign the terminal equipment to other customers. If the dying gasp signal were not sent, then the terminal equipment could remain connected to the customer's inactive communication line indefinitely. A dying gasp signal can also log the AC power supply failure for customer service purposes.

It is desirable to provide an improved dying gasp signal after the loss of AC power but prior to the loss of the DC power supply causing the communication gateway to power down and become non-operational.

SUMMARY OF THE DISCLOSURE

Various methods, apparatuses, and systems are described for communicating a loss of an AC power source. In at least certain embodiments, a broadband communication gateway receives a direct current (DC) output signal from an alternating current (AC) to DC converter that detects a loss of an AC input signal. The apparatus further includes a processing unit that generates a communication message in response to receiving an interrupt signal based on the detection of the loss of the AC input signal. The processing unit controls an analog front end that sends the communication message to a device external to the broadband communication gateway in response to the interrupt signal prior to a voltage of the DC output signal decreasing below a threshold voltage needed for operation of the broadband communication gateway.

BRIEF DESCRIPTION OF THE DRAWINGS

The drawings refer to embodiments of the disclosure in which.

While the disclosure is subject to various modifications and alternative forms, specific embodiments thereof have been shown by way of example in the drawings and will herein be described in detail. The disclosure should be understood to not be limited to the particular forms disclosed, but on the contrary, the intention is to cover all modifications, equivalents, and alternatives falling within the spirit and scope of the disclosure.

DETAILED DISCUSSION

In the following description, numerous specific details are set forth, such as examples of specific signals, named components, connections, number of windings in a transformer, example voltages, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure. The specific details set forth are merely exemplary. Further specific numeric references such as a first converter, may be made. However, the specific numeric reference should not be interpreted as a literal sequential order but rather interpreted that the first converter is different than a second converter. Thus, the specific details set forth are merely exemplary. The specific details may be varied from and still be contemplated to be within the spirit and scope of the present disclosure. The term coupled is defined as meaning connected either directly to the component or indirectly to the component through another component.

In general, various methods, apparatuses, and systems are described for communicating a loss of an AC power source. In at least certain embodiments, an apparatus includes a converter having one or more inputs ports to receive an AC input signal. The converter generates a DC output signal based on the AC input signal and a feedback signal of a feedback module located in the converter. The converter has a detector to detect a loss of the AC input signal. The detector is coupled to the feedback module. The apparatus further includes a communication gateway having one or more input ports to receive the DC output signal from one or more output ports of the converter. The apparatus further includes a processing unit which generates an interrupt service routine based on the detection of the loss of the AC input signal. The processing unit controls an analog front end that sends a communication message to a communication service or maintenance provider in response to the interrupt service routine prior to a voltage of the DC output signal decreasing below a threshold voltage needed for operation of the communication gateway. At least one of the communications service provider and communications maintenance provider determine that the communication gateway is stopping a communication session because of the loss of the AC input signal based on receiving the communication message.

Figure 1:
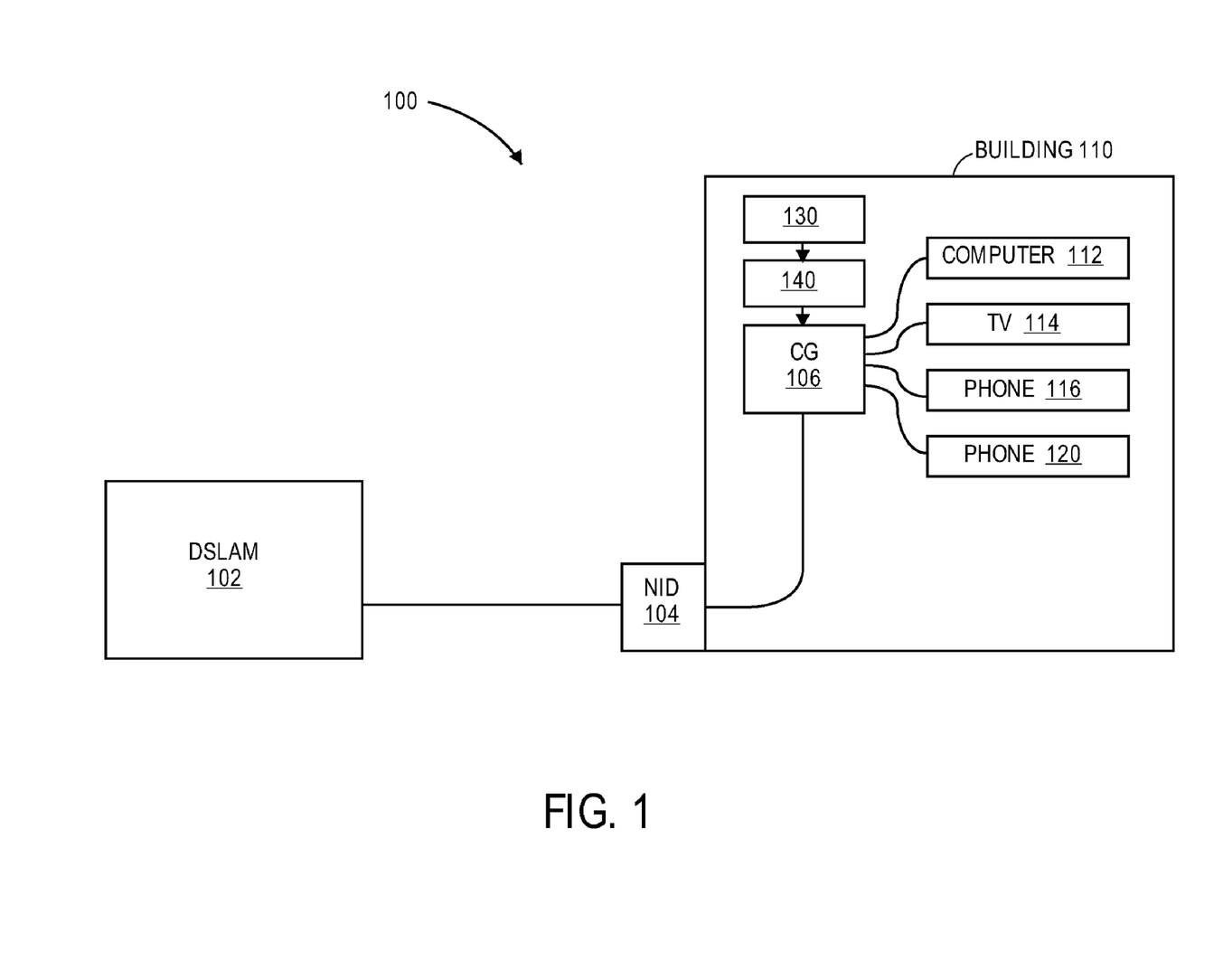
FIG. 1 shows a block diagram of an embodiment of a central office containing a Digital Subscriber Line Access Multiplexer (DSLAM) sending communications to a communication gateway.

FIG. 1 shows a block diagram of an embodiment of a central office of a communications service provider, such as a public phone company, containing a Digital Subscriber Line Access Multiplexer (DSLAM) sending communications to a communication gateway via a network interface device (NID). The NID 104 may include a connection box with passive safety elements such as lightning arrestors. The NID 104 separates the telephone company's wiring from the customer premises wiring.

The DSLAM 102 sends communications to a communication gateway (CG) 106, such as a multiple tone DSL based transmitter-receiver, via the NID 104. The CG 106 routes various types of communications, such as data, voice, and video, into the building 110. The communications may be sent to a computer 112, television 114, phone 116, and phone 120.

An AC power supply 130 couples to an AC/DC power converter 140 to provide DC power to the CG 106. The AC power supply 130 may be any conventional AC power source available in the building 110. The building 110 may be any type of building, dwelling, or structure that has a power source. The AC/DC power converter 140 converts a high voltage AC signal such as 120 volts or greater into a low voltage DC signal such as less than or equal to 24 volts that is suitable for powering the CG 106.

In at least certain embodiments, a system for communicating a loss of an AC power supply includes the AC/DC power converter 140 having one or more inputs ports to receive an AC input signal from the AC power supply 130. The AC/DC power converter 140 generates a DC output signal based on the AC input signal. The converter has a detector (not shown) to detect a loss of the AC input signal. The system 100 further includes the CG 106 having one or more input ports to receive the DC output signal from one or more output ports of the AC/DC power converter 140. The CG 106 includes a processing unit (not shown) which generates an interrupt service routine based on the detection of the loss of the AC input signal. The processing unit by controlling other circuitry sends a communication message in response to the interrupt service routine prior to a voltage of the DC output signal decreasing below a threshold voltage needed for operation of the CG 106.

In the event of the loss of the AC power supply, the communication message may be a dying gasp or disconnect signal sent from the CG 106 to the DSLAM 102 in order to inform terminal equipment at the central office that the customer is stopping the communication session because of an AC power failure. The central office can re-assign the terminal equipment based on receiving the disconnect signal.

The design for the system 100 allows the communication of the loss of the AC power supply to the DSLAM 102 and central office prior to the communication gateway becoming inoperable from the loss of the AC power supply. At least one of a communications service provider and a communications maintenance provider can then re-assign bandwidth previously assigned to the CG 106.

Figure 2:
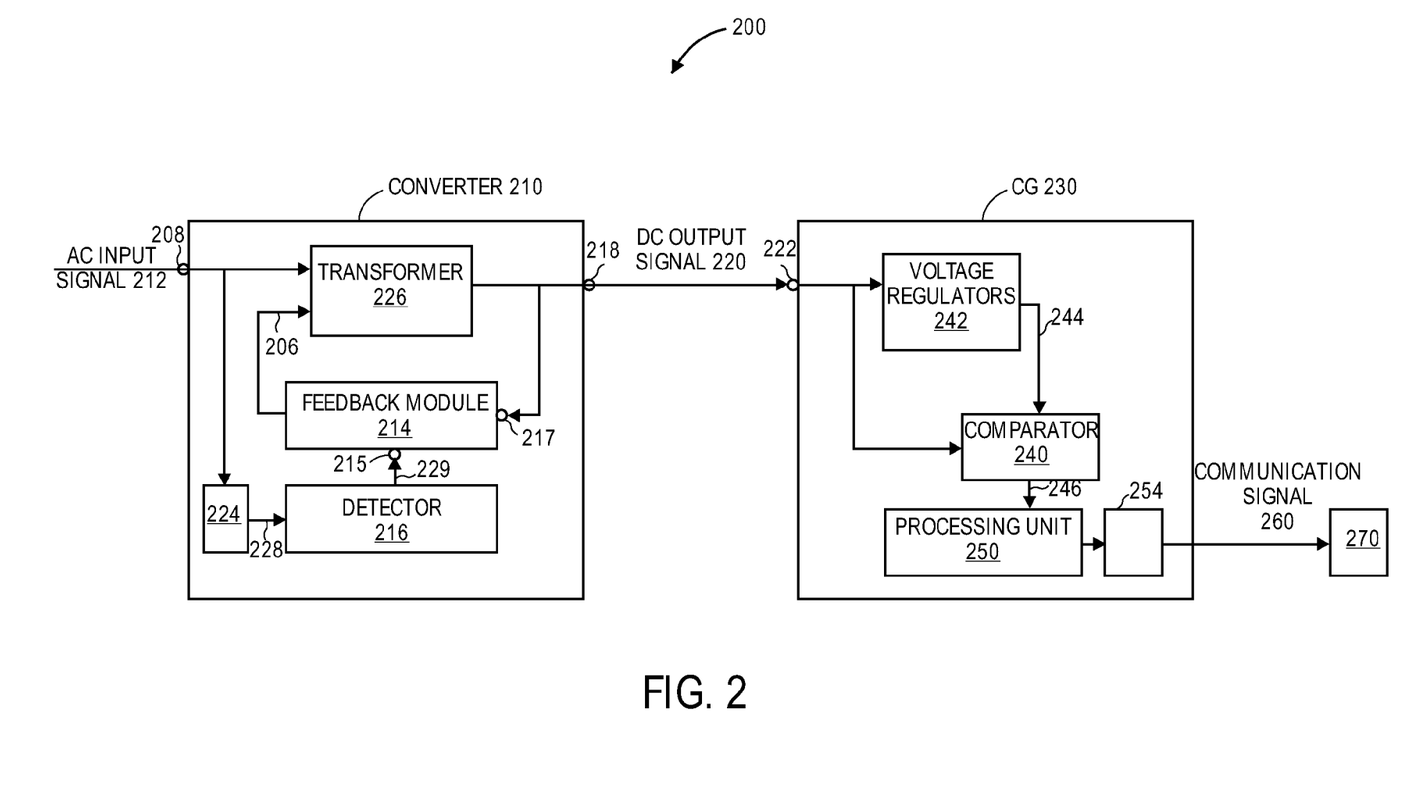
FIG. 2 shows a block diagram of an embodiment of communicating a loss of an AC power supply.

FIG. 2 shows a block diagram of an embodiment of communicating a loss of an AC power supply. In at least certain embodiments, an apparatus 200 includes a broadband communication gateway 230 having one or more input ports such as input port 222 to receive a DC output signal 220 from one or more output ports such as output port 218 of an AC to DC converter 210 having a detector 216 to detect a loss of an AC input signal 212. The converter 210 further includes one or more inputs ports such as input port 208 to receive the AC input signal 212 from a conventional AC power supply. The converter 210 generates the direct current DC output signal 220 based on the AC input signal 212 and a feedback signal 206 generated by a feedback module 214 that is coupled to the detector 216.

The converter 210 further includes isolation unit 224 such as an opto-isolator and transformer 226 to provide isolation between an AC portion and a DC portion of the converter 210. The isolation unit 224 to receive the AC input signal 212 and to generate a first voltage signal 228 that is sent to the detector 216 that generates a second voltage signal 229 in response to the first voltage signal 228. The second voltage signal 229 is sent to one or more input ports of the feedback module 214 such as input port 215. Input port 217 of the feedback module 214 receives the DC output signal 220 of the converter 210. The second voltage signal 229 offsets the DC output signal 220 by altering the feedback signal 206 based on the loss of the AC input signal 212 that is detected by the detector 216.

The communication gateway 230 further includes a processing unit 250 coupled to or located within an analog front end 254 of the broadband communication gateway 230. The processing unit 250 generates a communication signal 260 based on the detection of the loss of the AC input signal 212. The processing unit 250 by controlling the analog front end 254 sends the communication signal or message 260 to a device external to the broadband communication gateway 230 in response to a interrupt signal 246 prior to the voltage of the DC output signal 220 decreasing below a threshold voltage needed for operation of the broadband communication gateway 230.

The broadband communication gateway 230 further includes a comparator 240 to generate the interrupt signal 246 based on comparing the DC output signal 220 received from the converter 210 and a regulated voltage signal 244 provided by voltage regulators 242. The communication signal 260 is generated based on the processing unit 250 receiving the interrupt signal 246 that represents a predetermined change in the DC output signal 220. The predetermined change indicates that the loss of the AC input signal 212 has been detected by the detector 216. In some embodiments, the predetermined change may include a five percent or greater change in the voltage level of the DC output signal 220. In one embodiment, the predetermined change is a ten percent change in the voltage level of the DC output signal 220.

The communication message 260 generated in response to the processing unit 250 receiving the interrupt signal 246 is based on the loss of the AC input signal 212 and indicates to at least one of a communications service provider and a communications maintenance provider a disconnect condition between the broadband communication gateway 230 and an external device 270 being monitored by at least one of the communications service provider and the communications maintenance provider. The external device 270 may be the DSLAM 102, a remote terminal, a central office, or other device for transferring communications between the broadband communication gateway 230 and the external device 270. At least one of the communications service provider and communications maintenance provider determine that the broadband communication gateway 230 is stopping a communication session because of the loss of the AC input signal in order for at least one of the communications service provider and communications maintenance provider to reassign bandwidth previously assigned to the broadband communication gateway.

Figure 3:
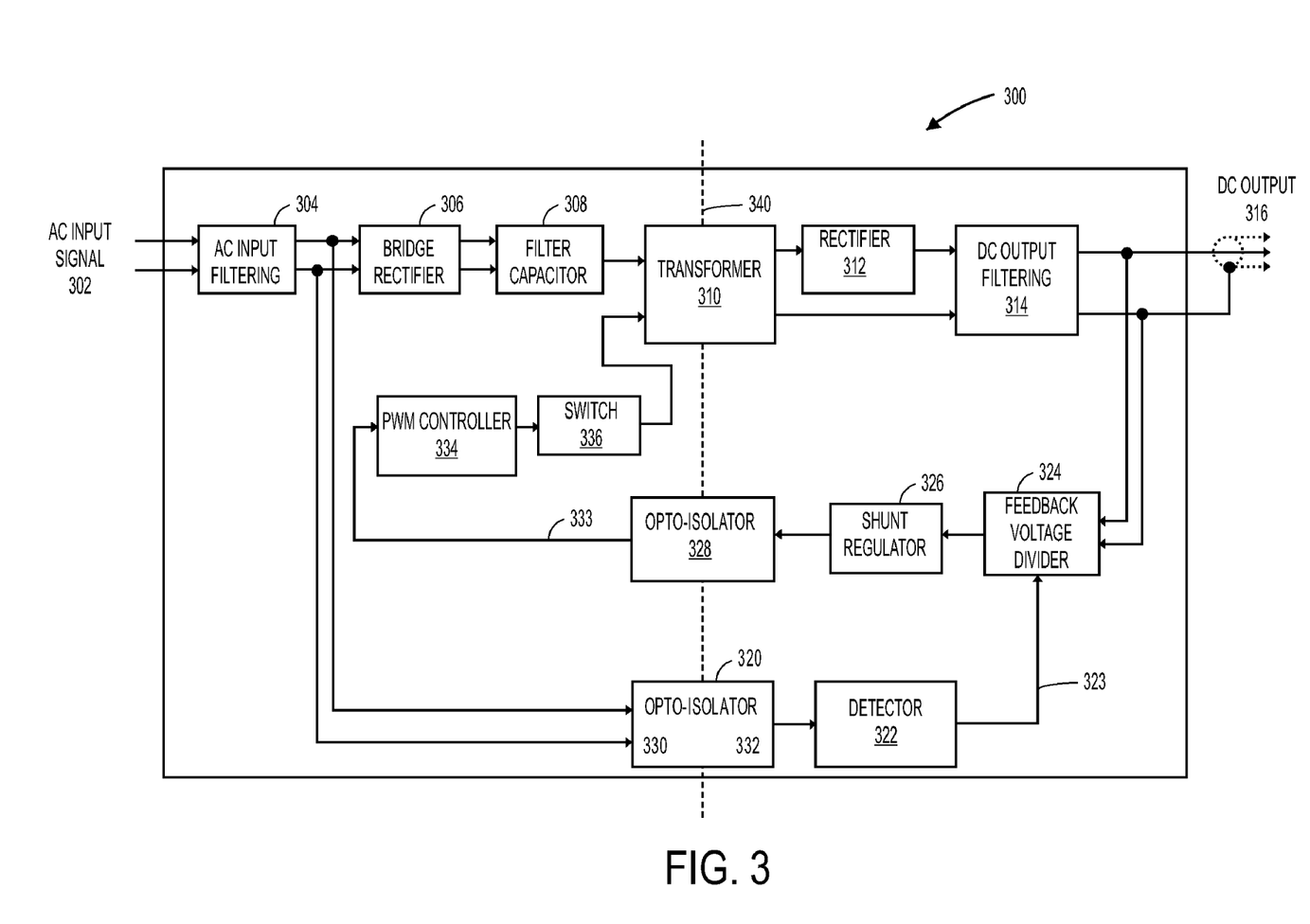
FIG. 3 shows a block diagram of an embodiment of an AC to DC converter.
Figure 4:
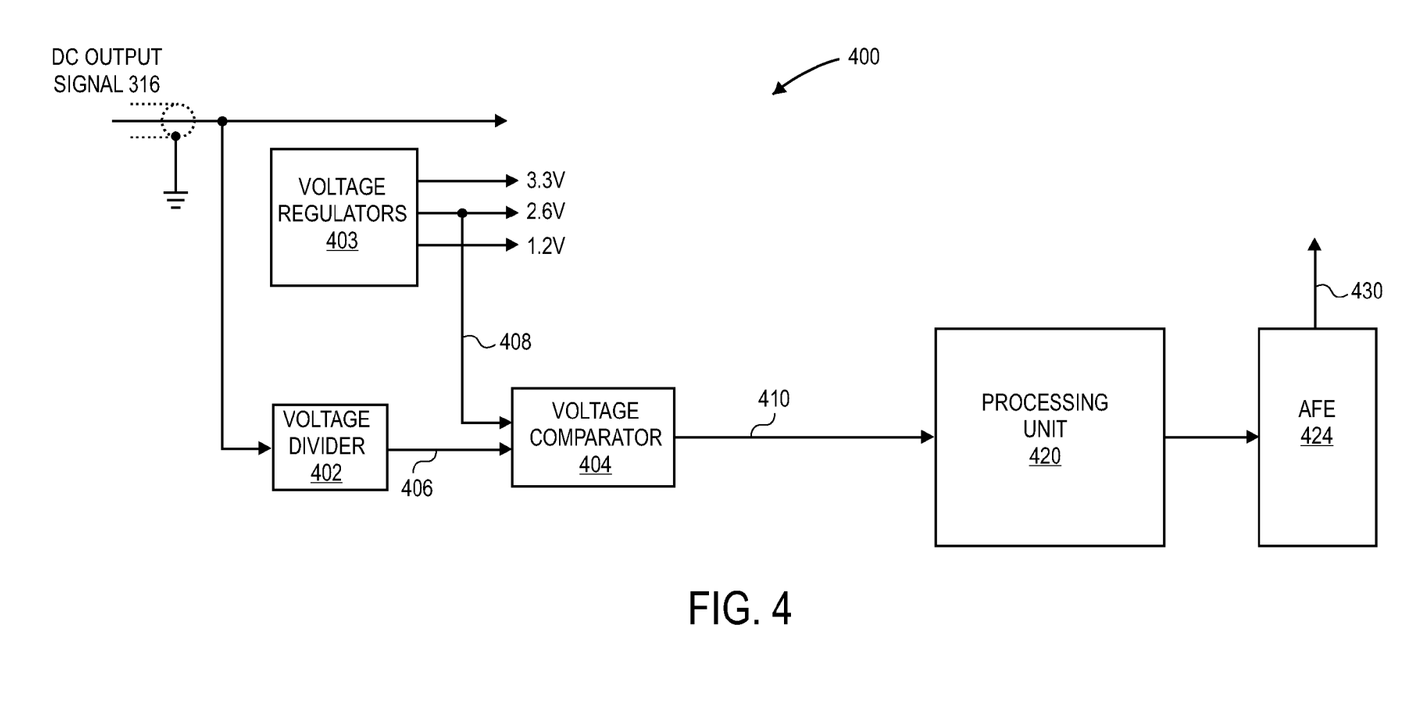
FIG. 4 shows a block diagram of an embodiment of a communication gateway.

FIG. 3 shows a block diagram of an embodiment of an AC to DC converter. The converter 300 converts an AC input signal 302 into a DC output signal 316 that provides power to a communication gateway as illustrated in FIG. 4. The AC input signal 302 may be any type of conventional AC signal such as a 120V or 240V AC signal. The AC input filter 304 removes transient noise from the AC input signal 302. A bridge rectifier 306 converts the AC input signal 302 into a DC signal. In one embodiment, the bridge rectifier 306 provides full wave rectification from the two wire AC input signal 302. For both polarities of the voltage at the input bridge, the polarity of the output is constant with a pulsating magnitude. A filter capacitor 308 decreases the variations in the raw output voltage waveform from the bridge rectifier 306. An increase of voltage received by the filter capacitor 308 correspondingly stores excess charge in the capacitor 308 which may store up to approximately the peak voltage of the AC input signal 302. The charge in the filter capacitor 308 may temporarily discharge to provide a power source in the event of the loss of the AC input signal 302.

The filter capacitor 308 charges to a high voltage greater than 120 volts that is approximately equal to a peak voltage of the AC input signal 302. For a typical 240V AC input signal 302 the peak voltage may be as high as 382V. The energy stored in a capacitor is proportional to the capacitance of the capacitor multiplied by the stored voltage of the capacitor squared. The filter capacitor 308, located in the converter 300, stores a certain energy value based on a low capacitance and the high peak voltage of the AC input signal 302 compared to a capacitor, located in the communication gateway 400, that receives a low voltage DC signal less than 24 volts such as 5 or 12 volts and requires a high capacitance to store the same certain energy value. A capacitor located in the communication gateway 400 having a high capacitance and a voltage less than 24 volts is substantially larger, more expensive, and less energy efficient compared to the filter capacitor 308 located in the converter having a low capacitance and a voltage greater than 120 volts. For example, in one embodiment storing a certain amount of energy in the capacitor 308 having 382 volts and located in the converter 300 is approximately one thousand times more efficient than storing a like amount of energy in a 5 volt capacitor located in the communication gateway 400. Thus, a capacitor located in the converter 300, rather than the communication gateway 400, can have a significantly lower capacitance and consequently smaller size and cost. Storing the energy in the converter 300 for sustaining the communication gateway 400 long enough to generate the communication message 430 also shifts the size and cost burden to the converter 300, which has a smaller assembly and associated retooling costs compared to the communication gateway 400.

The transformer 310 is an electrical device that transfers energy from an AC portion (left of the dotted line 340) to a DC portion (right of the dotted line 340) of the converter 300. A rectifier 312 rectifies the voltage signal received from the transformer 310 and a DC output filter 314 filters this voltage signal into the DC output signal 316 that provides power to the communication gateway 400.

An opto-isolator 320 and detector 322 monitor the AC input signal 302. The opto-isolator 320 receives the AC input signal 302 and provides isolation between the AC and DC portions of the converter 300. The opto-isolator 320 includes a light emitting diode (LED) section 330 that receives the AC input signal 302 that may be a differential voltage scaled to protect the LED section 330 from overload. The opto-isolator 320 also includes a photo transistor section 332 that drives a missing pulse detector 322 that includes a retriggerable, resettable, monostable multivibrator. The detector 322 is powered by the DC output signal 316.

When the AC input signal 302 is present, the LED section 330 turns on and off at the AC frequency and the detector 322 is triggered at the same rate which may be 50 or 60 Hertz (Hz), for example. A 50 Hz frequency corresponds to a 20 millisecond time period of the AC input signal 302. The detector 322 includes a pulse generation component to set a pulse duration slightly longer than a period of the AC input signal 302. In one embodiment, the pulse duration of the detector 322 is set to approximately ten percent longer than one cycle or period of the AC input signal 302. For example, an AC input signal 302 having a 20 millisecond time period would result in a pulse duration of 22 milliseconds for the detector. If a steady stream of the AC input signal 302 is present, the detector 322 is retriggered before an output pulse of the detector 322 times out and an output signal 323 of the detector 322 remains asserted without interruption.

However, if the AC input signal 302 is missing, then the detector 322 times out without being retriggered and the output signal 323 of the detector 322 changes to a de-asserted state. In some embodiments, the detector 322 includes a CMOS integrated circuit with outputs that are driven symmetrically between ground and supply voltage. This output signal 323 can be applied via a filter (not shown) to the feedback voltage divider 324. When the detector 322 changes state the current added to the feedback voltage divider 324 offsets the DC output signal 316. A loss of the AC input signal 302 may be signaled as an approximately ten percent downward change in the DC output signal 316 in one embodiment. The magnitude of the remaining DC output signal 316 is such that the communication gateway 400 is still operational for certain functionality such as generating and sending a communication signal to a communications service provider or communication maintenance provider.

The converter 300 further includes a feedback component that includes the feedback voltage divider 324, a shunt regulator 326, an opto-isolator 328, a switcher pulse width modulated controller 334, and a switch 336. These components collectively provide the feedback path for the DC output signal 316. The feedback voltage divider 324 includes various resistors that determine the voltage level of the DC output signal 316. The shunt regulator 326 provides an internal voltage reference while the opto-isolator 328 provides isolation between the AC and DC portions of the converter 300. The pulse width modulated controller 334 modulates a feedback signal 333 to generate a high frequency signal (e.g., sixty-four kilohertz) received by the transformer 310 in order to produce the DC output signal 316.

FIG. 4 shows a block diagram of an embodiment of a communication gateway. The communication gateway 400 includes a voltage divider 402, voltage regulators 403, voltage comparator 404, processing unit 420 and analog front end (AFE) 424. The communication gateway 400 receives the DC output signal 316 from the converter 300. The voltage divider 402 scales the DC output signal 316 to a suitable level for the voltage comparator 404 that compares the DC signal 406 to a signal 408 of the voltage regulators 403. Inputs of the voltage regulators 403 are designed to absorb the decrease in the DC output signal 316 without producing harmful transients at outputs of the voltage regulators 403 based on the loss of the AC input signal 302. Voltage comparator 404 sends an interrupt signal 410 to the processing unit 420 that may be a system on a chip and/or an application specific integrated circuit (ASIC). The processing unit 420 may have a detector component (not shown) that determines whether a voltage level of the DC signal 410 has changed by a predetermined amount indicating the loss of the AC input signal 302. The processing unit 420 generates an interrupt service routine if the detector component determines that the voltage level of the interrupt signal 410 has changed by the predetermined amount. In one embodiment, the predetermined change may include a five percent or greater decrease in the voltage level of the interrupt signal 410. The interrupt signal 410 starts a routine that generates the communication signal or message 430 that is sent to the communication service provider and/or maintenance provider by an analog front end circuit 424 being controlled by the processing unit 420. The communication message 430 indicates the loss of the AC power supply causing the disconnect of the communication gateway 400 from the central office or remote terminal of the telecommunication service provider. The interrupt signal 410 that starts the interrupt service routine may be non-maskable in that it has a higher priority than nearly all other operations of the processing unit 420.

The communication message may be a dying gasp message that informs the terminal equipment at the central office that the subscriber is stopping a communication session such as DSL session because of an AC power failure. Using this information, the central office can free up and re-assign the terminal equipment. If the dying gasp signal were not sent, the terminal equipment would remain connected to the subscriber's inactive DSL line indefinitely, wasting the resource. A dying gasp signal can also log the AC power failure for customer service purposes.

In the event of AC power loss and dying gasp service routine, the comparator 404, regulators 403, processing unit 420 and analog front end 424 need to be operational for sufficient duration to send the communication message to terminal equipment of the telephone company. FIGS. 3 and 4 illustrate an apparatus for providing DC power to a communication gateway for a short time after the loss of the AC input signal 302. The detector 322 is located in the converter 300, rather than the communication gateway 400, in order to quickly detect the loss of the AC input signal 302. Based on the quick detection and using the energy stored in filter capacitor 308, the processing unit 420 can generate a disconnect message prior to the DC output signal decreasing to a voltage level below a threshold voltage necessary for operation of the communication gateway 400. The processing unit 420 may control an analog front end 424 that sends messages to the terminal equipment of the telephone company.

FIGS. 3 and 4 may be altered in alternative embodiments of the present disclosure. In a first alternative embodiment, a high frequency AC component (e.g., 33 kHz to 64 kHz) is imposed on the DC output signal 316 of the converter 300. This AC component is generated in the converter 300 and shut off when the AC input signal is detected as missing using a similar detection technique as described above in reference to the detector 322. The high frequency AC component is detected in the communication gateway 400 with a tuned circuit, which has noise immunity advantages. The converter 300 further includes large inductor chokes in series with the DC path to add a high frequency AC component at the transmit end and separate this component from the DC component at the receiving end.

The high frequency AC component may be a continuous wave or amplitude modulated with the AC input signal 302. If the high frequency AC component is amplitude modulated, then the burden of detecting the missing AC input signal 302 is shifted to the communication gateway 400. The detector component may be an easily obtained integrated circuit (IC) that requires a changing amplitude to set an automatic gain control for the IC.

In a second alternative embodiment, an impulse noise generated by the PWM controller 334 becomes a signaling medium using frequency shift keying. The switching frequency is detected in the communication gateway 400 as impulse noise. When the AC input signal 302 is detected as missing, the frequency of the converter 300 is intentionally shifted. The frequency shift is detected in the communication gateway 400 and the interrupt signal generated by the processing unit 420.

Figure 5:
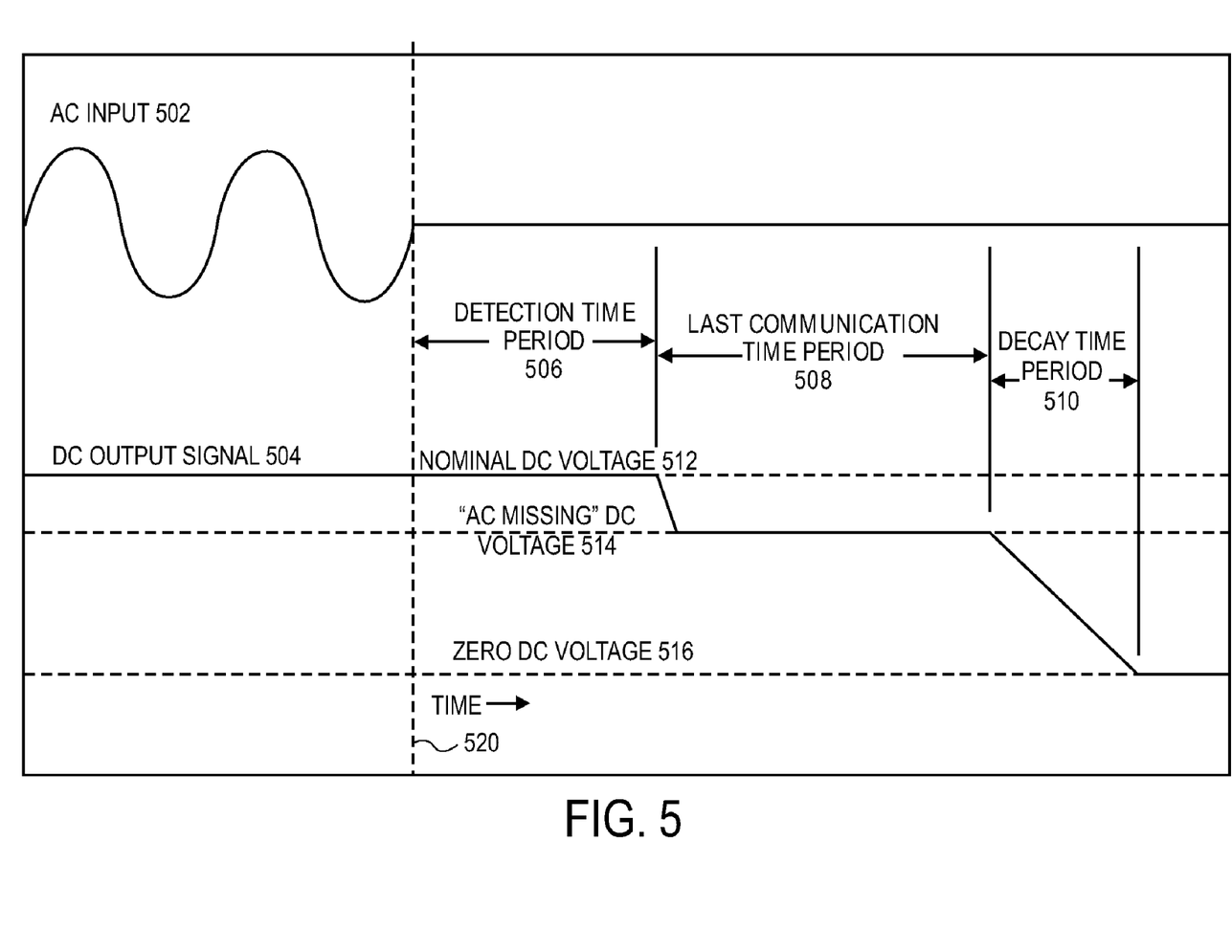
FIG. 5 shows a block diagram of an embodiment of a DC output waveform in response to the loss of an AC input signal.

FIG. 5 shows a block diagram of an embodiment of a DC output waveform in response to the loss of an AC input signal. The AC input signal 502 may stop at any point in its cycle with the AC input signal 502 corresponding to the AC input signal 302 of FIG. 3 in one embodiment. The DC output signal 504 has a nominal DC voltage 512, an AC missing DC voltage 514 and a zero DC voltage 516.

At time 520, the AC input signal 502 stops with a detection time period 506 following the time 520. During the detection time period 506, a detector such as detector 322 detects the loss of the AC input signal 502. The detection time period 506 is approximately equal to or less than a period of the AC input signal 502 based on when the detector having a pulse duration slightly longer than the AC time period is retriggered by the AC input signal 502. The DC output signal 504 drops in voltage at the end of the detection time 506 based on the loss of the AC input signal 502. The DC output signal 504 may correspond to the DC output signal 316 in some embodiments of the present disclosure.

A last communication time period 508 represents the time period needed for a communication gateway such as the communication gateway 400 to generate a last communication message that is sent to a communication service or maintenance provider in order to indicate a loss of connection based on the loss of the AC input signal 502. In an embodiment, the last communication time period 508 is greater than or equal to 150 milliseconds.

During the last communication time period 508, a capacitor or other energy storage device such as the filter capacitor 308 provides the energy to temporarily sustain a voltage of the DC output signal 504 greater than a threshold voltage required for operation of the communication gateway so that a processing unit such as the processing unit 420 can generate a communication message in the event of the loss of the AC input signal 502. The filter capacitor 308 may charge in the presence of the AC input signal 502 and discharge in the absence of the AC input signal 502. In some embodiments, the filter capacitor 308 temporarily maintains the voltage of the DC output signal 504 greater than the threshold voltage required for operation of the communication gateway for a time period 508 greater than or equal to 150 milliseconds in order for the processing unit 420 to generate a communication message prior to the voltage of the DC output signal 504 decreasing below the threshold voltage and decaying during an arbitrary decay time period 510.

Figure 6:
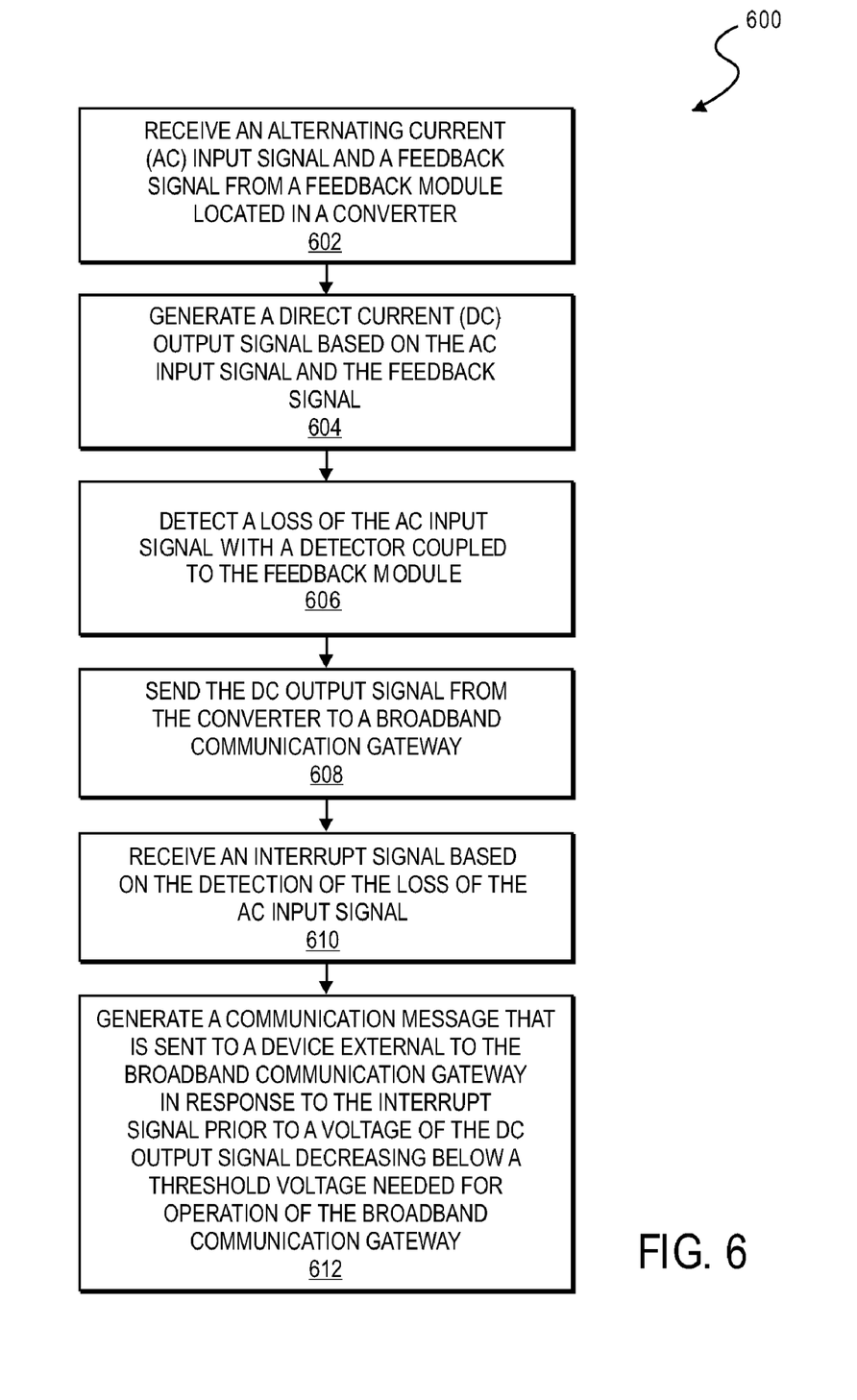
FIG. 6 shows a flow diagram for a method of communicating a loss of an AC power supply.

FIG. 6 shows a flow diagram for a method of communicating a loss of an AC power supply. The method includes receiving an AC input signal and a feedback signal from a feedback module located in a converter at block 602. The method further includes generating a DC output signal based on the AC input signal and the feedback signal at block 604. The method further includes detecting a loss of the AC input signal with a detector coupled to the feedback module at block 606. The loss of the AC input signal changes an amplitude of the DC output signal as illustrated in FIG. 5. The detector is located in the converter. The detector alters the feedback signal if the detector detects the loss of the AC input signal. The DC output signal is changed based on the detection of the loss of the AC input signal. Specifically, the amplitude of the DC output signal changes based on the change in the feedback signal. The method further includes sending the DC output signal from the converter to a communication gateway at block 608. The method further includes receiving an interrupt signal based on the detection of the loss of the AC input signal at block 610. The method further includes generating a communication message in response to the interrupt signal prior to a voltage of the DC output signal decreasing below a threshold voltage needed for operation of the communication gateway at block 612.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Thus, according to embodiments of the present disclosure, apparatuses and methods for communicating the loss of an AC power supply are described. A converter provides power to a broadband communication gateway even if the AC power supply fails. A detector is located in the converter, rather than the broadband communication gateway, in order to quickly detect the loss of the AC power supply. Based on the quick detection, a processing unit located in the broadband communication gateway can generate a disconnect message prior to the DC output signal decreasing to a voltage level below a threshold voltage necessary for operation of the communication gateway.

While some specific embodiments of the disclosure have been shown the disclosure is not to be limited to these embodiments. For example, most functions performed by electronic hardware components may be duplicated by software emulation. Thus, a software program written to accomplish those same functions may emulate the functionality of the hardware components. The hardware logic may consist of electronic circuits that follow the rules of Boolean Logic, software that contain patterns of instructions, or any combination of both. The disclosure is to be understood as not limited by the specific embodiments described herein, but only by scope of the appended claims.

What is claimed is:

1. An apparatus comprising:
   a broadband communication gateway having one or more input ports to receive a direct current (DC) output signal from an alternating current (AC) to DC converter to detect a loss of an AC input signal; and
   a processing unit to generate a communication message in response to receiving an interrupt signal based on the detection of the loss of the AC input signal, the processing unit to control an analog front end that sends the communication message to a device external to the broadband communication gateway in response to the interrupt signal prior to a voltage of the DC output signal decreasing below a threshold voltage needed for operation of the broadband communication gateway wherein the communication message generated in response to the processing unit receiving the interrupt signal is based on the loss of the AC input signal and indicates to at least one of a communications service provider and a communications maintenance provider a disconnect condition between the broadband communication gateway and an external device coupled over a telephone network to the broadband communication gateway.

2. The apparatus of claim 1, wherein the converter further comprises one or more inputs ports to receive the AC input signal, the converter to generate the DC output signal based on the AC input signal and a feedback signal received from a feedback module coupled to a detector to detect the loss of the AC input signal.

3. The apparatus of claim 2, wherein the detector comprises a monostable multivibrator, the detector has logic that is configured to be retriggerable and resettable in order to detect the loss of the AC input signal.

4. The apparatus of claim 2, wherein the detector comprises a pulse generation component to set a pulse duration slightly longer than a period of the AC input signal.

5. The apparatus of claim 2, wherein the converter further comprises an opto-isolator to provide isolation between an AC portion and a DC portion of the converter, the opto-isolator to receive the AC input signal and to generate a first voltage signal that is sent to the detector, wherein the detector to generate a second voltage signal in response to the first voltage signal, the second voltage signal is sent to one or more input ports of the feedback module.

6. The apparatus of claim 5, wherein the one or more ports of the feedback module to receive the DC output signal of the converter and the second voltage signal from the detector, the second voltage signal to offset the DC output signal in order to alter the DC output signal by altering the feedback signal based on the loss of the AC input signal.

7. The apparatus of claim 1, wherein the broadband communication gateway further comprises a comparator to generate the interrupt signal based on comparing the DC output signal received from the converter and a regulated voltage signal and the communication message is generated based on receiving a predetermined change in the DC signal from the comparator, the predetermined change indicates that the loss of the AC input signal has been detected.

8. The apparatus of claim 7, wherein the predetermined change comprises an approximately ten percent change in the voltage level of the DC signal received from the comparator.

9. The apparatus of claim 1, wherein at least one of the communications service provider and communications maintenance provider to determine that the broadband communication gateway is stopping a communication session because of the loss of the AC input signal in order for at least one of the communications service provider and communications maintenance provider to reassign bandwidth previously assigned to the broadband communication gateway.

10. A system comprising:
    a power converter having one or more inputs ports to receive an alternating current (AC) input signal, the converter to generate a direct current (DC) output signal based on the AC input signal and a feedback module located in the converter, the converter having a detector to detect a change in an amplitude of the DC output signal based on a loss of the AC input signal with the detector coupled to the feedback module;

a digital subscriber line (DSL) communication gateway having one or more input ports to receive the DC output signal from one or more output ports of the converter;

a processing unit to generate an interrupt service routine in response to receiving an interrupt signal based on the detection of the loss of the AC input signal, the processing unit to control an analog front end that sends a communication message to a device external to the broadband communication gateway in response to the interrupt service routine prior to a voltage of the DC output signal decreasing below a threshold voltage needed for operation of the broadband communication gateway; and a digital subscriber line access multiplexer to couple over a telephone network to the DSL communication gateway.

11. The system of claim 10, wherein the converter further comprises:

an AC portion with a voltage greater than 120 volts having a filter capacitor that provides a temporary DC output signal in order to temporarily maintain a voltage of the DC output signal greater than the threshold voltage required for operation of the DSL communication gateway so that the analog front end can send the communication message in the event of the loss of the AC input signal; and a DC portion with a voltage less than 24 volts.

12. The apparatus of claim 11, wherein the converter further comprises an opto-isolator to provide isolation between the AC portion and the DC portion of the converter, the opto-isolator to receive the AC input signal and to generate a first voltage signal that is sent to the detector.

13. The system of claim 11, wherein the filter capacitor to temporarily maintain the voltage of the DC output signal greater than the threshold voltage required for operation of the DSL communication gateway for a time period greater than or equal to the time required for the processing unit to generate the interrupt service routine prior to the voltage of the DC output signal decreasing below the threshold voltage.

14. The system of claim 11, wherein the filter capacitor to charge to a high voltage greater than 120 volts that is approximately equal to a peak voltage of the AC input signal, the filter capacitor, located in the converter, to store a certain energy value based on a low capacitance and the high voltage compared to a capacitor, located in the DSL communication gateway, that receives a low voltage DC signal less than 24 volts and requires a high capacitance to store the same certain energy value.

15. A method comprising:

receiving an alternating current (AC) input signal and a feedback signal from a feedback module located in a converter;

generating a direct current (DC) output signal based on the AC input signal and the feedback signal; and detecting a loss of the AC input signal with a detector coupled to the feedback module, the detector located in the converter, sending the DC output signal from the converter to a broadband communication gateway;

receiving an interrupt signal based on the detection of the loss of the AC input signal; and generating a communication message that is sent to a device external to the broadband communication gateway in response to the interrupt signal prior to a voltage of the DC output signal decreasing below a threshold voltage needed for operation of the broadband communication gateway.

16. An apparatus comprising:

means for receiving an alternating current (AC) input signal and a feedback signal from a feedback module located in a converter;

means for generating a direct current (DC) output signal based on the AC input signal and the feedback signal; and means for detecting a loss of the AC input signal with a detector coupled to the feedback module, the detector located in the converter, means for sending the DC output signal from the converter to a broadband communication gateway;

means for receiving an interrupt signal based on the detection of the loss of the AC input signal; and means for generating a communication message that is sent to a device external to the broadband communication gateway in response to the interrupt signal prior to a voltage of the DC output signal decreasing below a threshold voltage needed for operation of the broadband communication gateway.

* * * * *